(12) United States Patent
Malayanur et al.

(10) Patent No.: US 12,517,484 B2
(45) Date of Patent: Jan. 6, 2026

(54) ENHANCED SECURITY OF PROCESS CONTROL INSTRUMENTS

(71) Applicant: Schneider Electric Systems USA, Inc., Foxborough, MA (US)

(72) Inventors: PavanKumar Malayanur, Hyderabad (IN); Stephen Richard Owen Beadle, Leicester (GB); Briane Ritchie, Bellingham, MA (US); Zakarya Drias, Boston, MA (US)

(73) Assignee: SCHNEIDER ELECTRIC SYSTEMS USA, INC., Foxborough, MA (US)

( * ) Notice: Subject to any disclaimer, the term of this patent is extended or adjusted under 35 U.S.C. 154(b) by 401 days.

(21) Appl. No.: 18/105,032

(22) Filed: Feb. 2, 2023

(65) Prior Publication Data

US 2024/0210907 A1 Jun. 27, 2024

(30) Foreign Application Priority Data

Dec. 22, 2022 (IN) .............................. 202211074558

(51) Int. Cl.
*G05B 19/042* (2006.01)
*H04L 9/40* (2022.01)

(52) U.S. Cl.
CPC ...... *G05B 19/0425* (2013.01); *H04L 63/0272* (2013.01); *H04L 63/0823* (2013.01)

(58) Field of Classification Search
None
See application file for complete search history.

(56) References Cited

U.S. PATENT DOCUMENTS

2020/0293477 A1 9/2020 Lefebvre et al.
2023/0185287 A1 6/2023 Welle

FOREIGN PATENT DOCUMENTS

| CN | 115480528 A | 12/2022 |
|---|---|---|
| EP | 3451215 A1 | 3/2019 |
| EP | 3907569 A1 | 11/2021 |

OTHER PUBLICATIONS

Extended European Search Report, from EP Application No. 23168820.1, dated Sep. 15, 2023, 11 pages.

*Primary Examiner* — Sean Shechtman
(74) *Attorney, Agent, or Firm* — Stinson LLP (57) ABSTRACT

System and method of securing a process control instrument of a process control system. An authorization server is configured to authenticate the process control instrument based on a unique secure code provided to the server in response to the process control instrument entering an enhanced secure mode as determined by a switch setting. In response to being authenticated in the enhanced secure mode, the process control instrument is configured to operate in a configuration state in which an authorized user is granted access to configure the security details of the process control instrument.

20 Claims, 9 Drawing Sheets

ENHANCED SECURITY OF PROCESS CONTROL INSTRUMENTS

BACKGROUND

Typical process control systems assign levels for segmenting physical processes, sensors, supervisory controls, operations, logistics, and the like. For example, the Purdue model for industrial control system security assigns Level 0 (L0) to physical process level field devices, including sensors and actuators. Level 1 (L1) devices include control or intelligent field devices, such as programmable logic controllers (PLCs) and remote terminal units (RTUs).

Due to the advent of connected physical and cyber systems, protecting process critical assets and remote elements can be challenging. There are various hardware control filters (e.g., firewalls, intrusion detection systems) before L0/L1 devices and various other software systems but they do not protect network-connected process control devices, transmitters/RTUs, and other critical process elements. For instance, process control instruments connected via Ethernet or Ethernet-APL are generally accessible to anyone using the network. The lack of protection leaves L0/L1 actual device elements, for example, vulnerable to attack. Unfortunately, conventional process control systems do not provide a complete secure system that includes protection for L0/L1 field devices.

SUMMARY

Aspects of the present disclosure provide enhanced security of critical elements. Even though other levels of the process control system may be compromised, very critical field instruments remain protected and ensure the process runs as expected.

In an aspect, a process control system comprises at least one process control instrument, at least one controller communicatively coupled to the process control instrument, and an authorization server communicatively coupled to the controller. The process control instrument has a plurality of access modes as determined by a switch setting associated with it. The access modes include an enhanced secure mode in which access for configuring the process control instrument is restricted to an authorized user. The authorization server is configured to authenticate the process control instrument based on a unique secure code provided to the server in response to the process control instrument entering the enhanced secure mode. In response to being authenticated in the enhanced secure mode, the process control instrument is configured to operate in a configuration state in which the authorized user is granted access to configure security details of the process control instrument.

In another aspect, a method of securing a process control instrument comprises determining a switch setting associated with a process control instrument. The switch setting places the process control instrument in a selected one of a plurality of access modes, namely, a normal mode, an enhanced secure mode, and a secure mode. The method further comprises receiving a unique secure code associated with the process control instrument in response to the process control instrument entering the enhanced secure mode based on the determined switch setting and authenticating the process control instrument based on the secure code. In response to the process control instrument being authenticated in the enhanced secure mode, the method includes granting access to an authorized user for configuring security details of the process control instrument.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
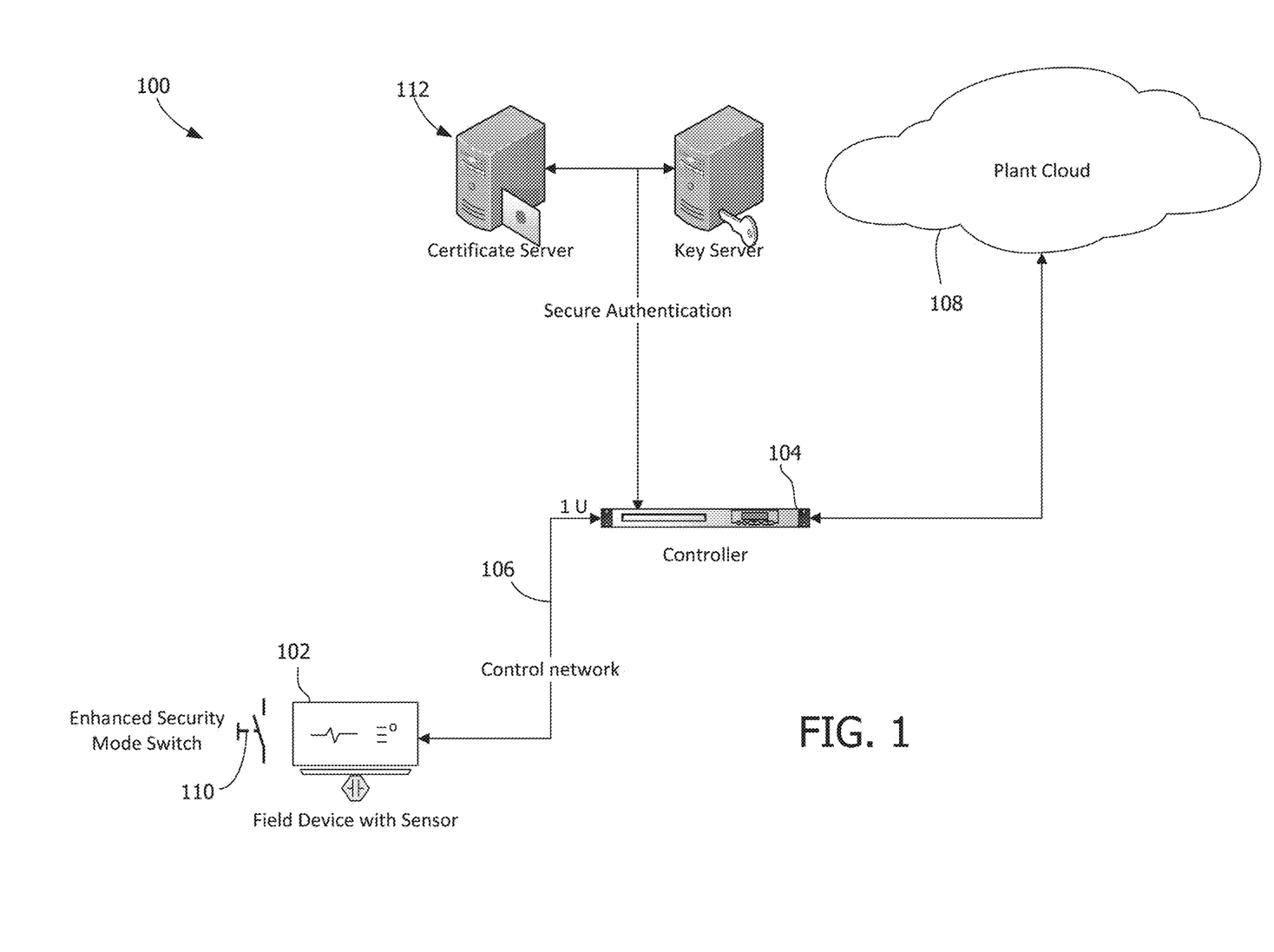
FIG. 1 is a block diagram of a partial process control system having a hardware switch for securing a network-connected field device according to an embodiment.

Aspects of the present disclosure provide remote enhanced security for process control instruments such as Level 0 (L0) and Level 1 (L1) field devices. FIG. 1 is a block diagram of a partial process control system 100 in which a field device 102 is coupled to a controller 104 via a control network 106. As shown, the controller 104 communicates on a data communication network illustrated as a plant cloud 108. Although described in the context of the field device 102, it is to be understood that aspects of the present disclosure may be employed to provide enhanced security for programmable logic controllers (PLCs), remote terminal units (RTUs), transmitters, controllers, field instruments, etc.

In the embodiment of FIG. 1, a hardware switch 110 associated with the network-connected field device 102 permits a user to place field device 102 in an enhanced secure mode. As an example, the hardware switch 110 is similar to a PLC's program mode key switch but is used for setup/admin level items such as Internet Protocol (IP) address settings (i.e., taking/controlling its identity). For environments in which physical contact is undesirable or prohibited, switch 110 may be embodied by, for example, a reed switch or a near-field communication (NFC) transponder. The field device 102 has three access modes as determined by switch 110: normal, secure, and enhanced secure. In the normal mode, the user can access and perform select non-secure functionality associated with field device 102. The default or initial state of field device 102 is the normal mode.

In the enhanced secure mode, the user can configure the security details of field device 102 so that it communicates securely. For example, the security details specify a cryptographic algorithm, trusted hosts at selected IP addresses, transport layer security (TLS), and/or the like required for operating field device 102 securely. In this manner, the device 102 is able to communicate securely based on the security configuration and respond only to select commands. This configuration is preferably performed during the initial commissioning of field device 102. Once configured, field device 102 operates in the secure mode, which is in accordance with the configured security details established in the enhanced secure mode.

To ensure its genuineness, field device 102 is installed with unique secure code, secret key, and/or token (referred to herein interchangeably as a code, key, or token). This code, which is stored in a secure memory of field device 102, permits authentication of field device 102 and its enhanced secure mode switch setting. In an alternative embodiment, the secure code is generated by software securely stored in a secure memory of field device 102. For example, the manufacturer stores the key in the device's memory at the factory or a user stores it there by other secure means (e.g., via secure media at delivery time). An authorization server 112 coupled to controller 104 provides secure authentication of field device 102 using the unique code or secret key. The unique secure code also permits tracking the origin or source of field device 102 and establishes its chain of custody. The code can also be used to determine if the device has been previously commissioned. In an embodiment, the code is time-restricted such that it is only valid for a predetermined time and/or altered to indicate field device 102 had been previously commissioned.

In an embodiment the authorization server 112 comprises a certificate server and/or a key server depending on the encryption type of the key for performing a multi-step or multi-factor authentication. It is to be understood that in addition to authenticating field device 102, authorization server 112 may be used to authenticate the user as an authorized user permitted to commission device 102 and make configuration changes. The authorization server 112 uses biometric scanning (e.g., fingerprint or facial recognition) or other known technique(s) in addition to or instead of the secret key to ensure the user is authorized to perform the commissioning. Although illustrated as coupled directly to controller 104, it is to be understood that authorization server 112 could be coupled to controller 104 via the plant cloud 108.

Figure 2:
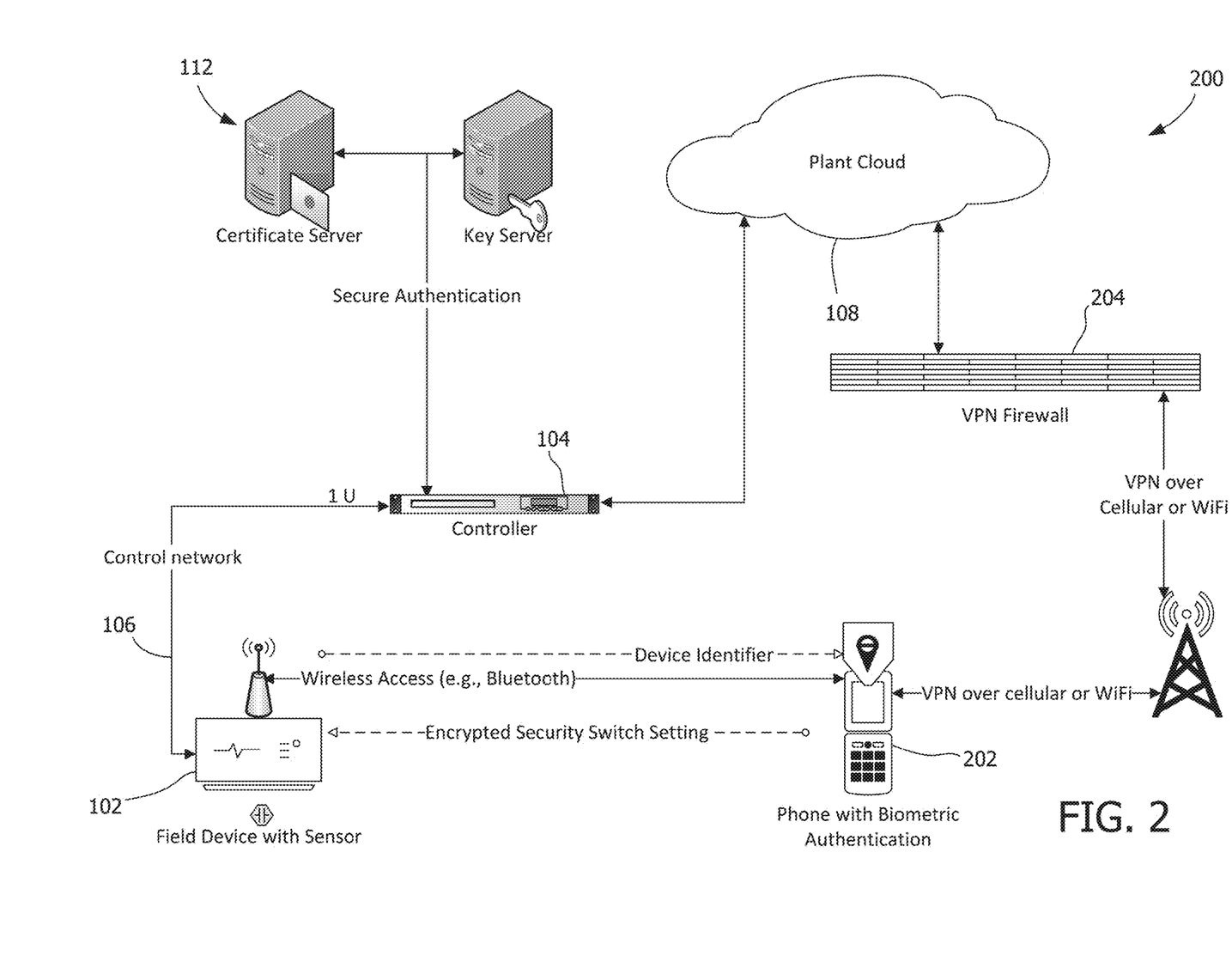
FIG. 2 is a block diagram of a partial process control system having a virtual switch with a local connection for securing a network-connected field device according to an embodiment.

FIG. 2 is a block diagram of a partial process control system 200 having a virtual switch (rather than the hardware switch 110 shown in FIG. 1) for securing the network-connected field device 102. A remotely supplied virtual switch setting is used in this embodiment for enhancing the security of field device 102. In FIG. 2, the remote virtual switch has a local connection provided by, for example, a handheld computing device 202 such as a smartphone or tablet, for receiving a device identifier from field device 102. In the illustrated embodiment, instead of setting a physical hardware switch to the enhanced secure mode, the user makes a virtual private network (VPN) connection to plant cloud 108 via a biometric security key or other secure means using the handheld computing device 202. A firewall 204 provides additional security. The computing device 202 shares the device identifier acquired from field device 102 and receives an encrypted security switch setting from authorization server 112 via plant cloud 108. The computing device 202 forwards the virtual security switch setting to field device 102 via a wireless (e.g., Bluetooth, NFC, infrared (IR), low bandwidth 'chirp' or other audio communication, etc.) or other local connection. The field device 102 then decrypts the switch setting with a key shared from the plant authorization server 112 and stores the switch setting in persistent secure memory for use instead of reading the setting of hardware switch 110.

Figure 3:
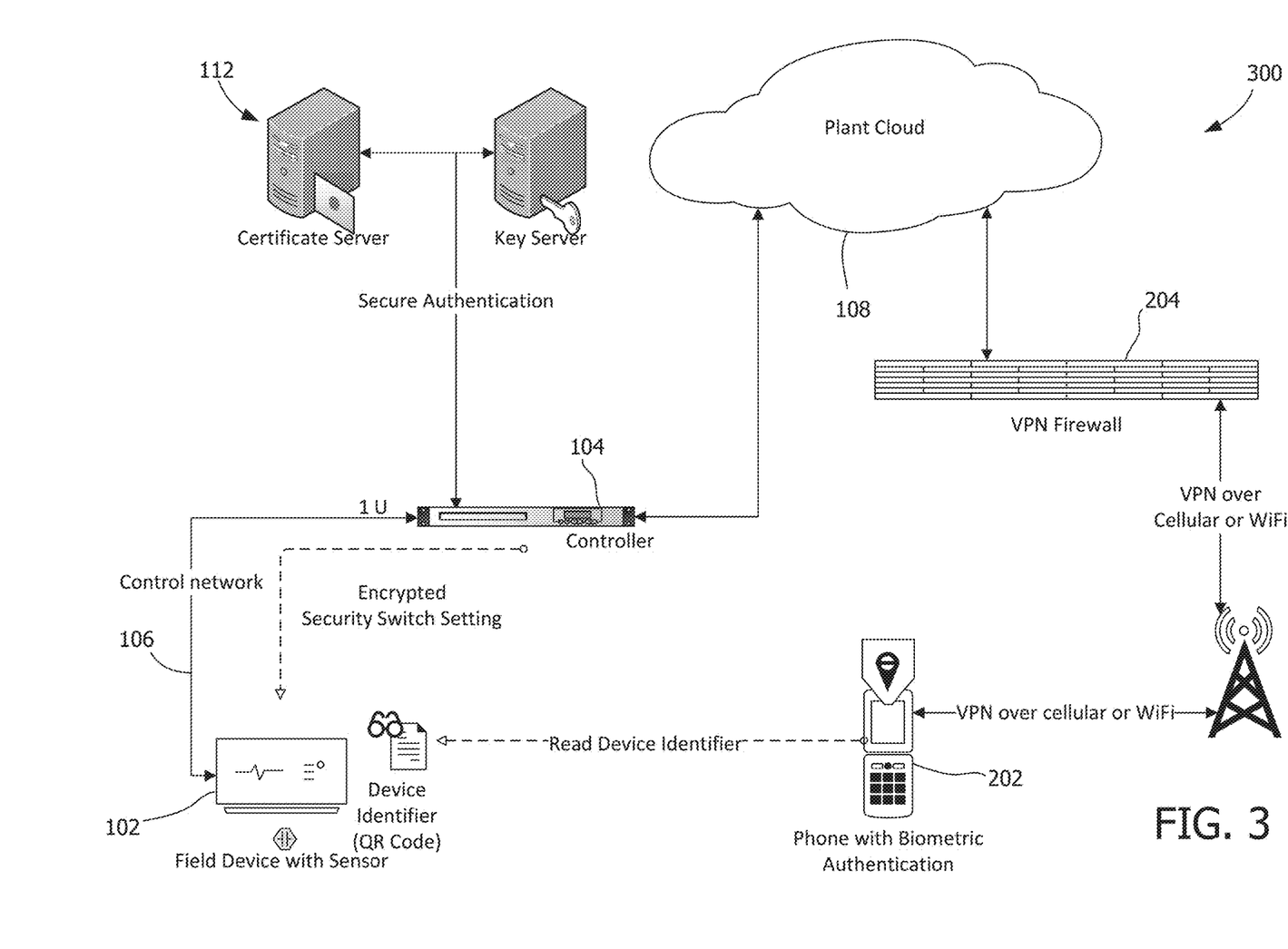
FIG. 3 is a block diagram of a partial process control system having a virtual switch with local access for securing a network-connected field device according to an embodiment.

FIG. 3 illustrates a partial process control system 300 having a virtual switch similar to FIG. 2 for securing network-connected field device 102 but with local access rather than a local connection. FIG. 3 shows the connections for using a virtual switch setting provided over the control network 106 for enhancing the security of field device 102. In this embodiment, the virtual switch is provided with local access and configured as an over-the-network enhanced security switch. In this mode, computing device 202 reads a device identifier from, for example, a quick response (QR) code on field device 102. For example, a one-time password (OTP) code generated in response to scanning the QR code can be used to manage access to field device 102. It is to be understood that computing device 202 may also read the device identifier from user input (e.g., manually input via a keypad) or from another form of code on the device 102. Where the user would otherwise set the hardware switch 110 to enhanced secure mode, the user instead makes a VPN connection to plant cloud 108 via a biometric security key or other secure means using computing device 202. The identifier is then sent over the VPN to authorization server 112 via plant cloud 108 to request an encrypted security switch setting be forwarded to field device 102 over the control network 106. The field device 102 then stores the switch setting in persistent secure memory for use instead of reading the setting of hardware switch 110.

Figure 4:
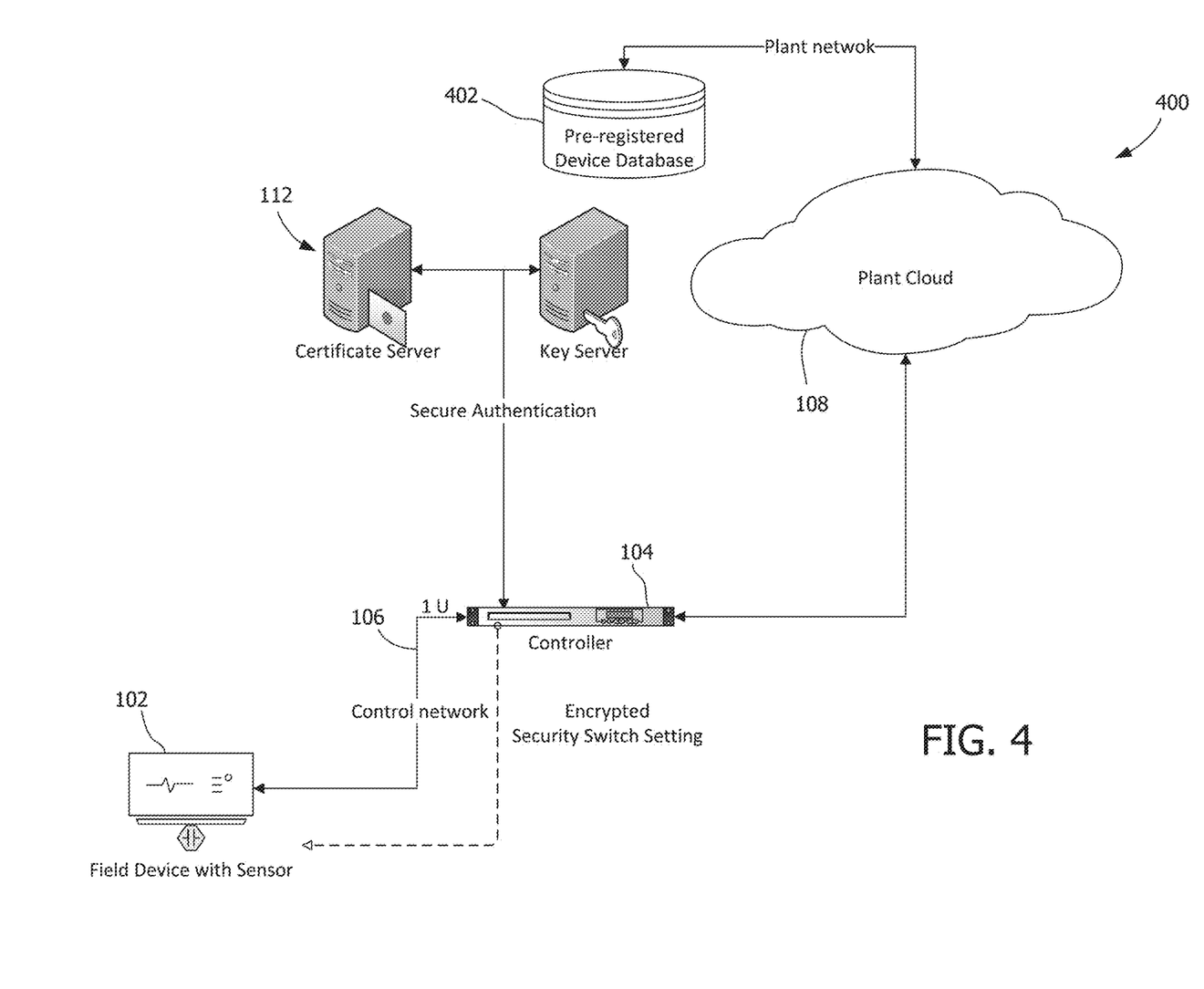
FIG. 4 is a block diagram of a partial process control system having a virtual switch without a local connection or local access for securing a network-connected field device according to an embodiment.

Referring now to FIG. 4, a partial process control system 400 is shown having a virtual switch for securing network-connected field device 102 without a local connection or local access. The illustrated embodiment of FIG. 4 includes connections for using a virtual switch setting provided over control network 106 for enhancing the security of field device 102 without the need for local access or local connection. As shown, the virtual security switch setting is provided in response to the user retrieving a device identifier from a pre-registered plant device database 402. The identifier is then sent to authorization server 112 via plant cloud 108 to request an encrypted security switch setting to be forwarded to field device 102 over control network 106. The field device 102 then stores the switch setting in persistent secure memory for use instead of reading the setting of hardware switch 110.

Aspects of the present disclosure provide secure methods for sharing virtual switch encryption keys using one or more out of band, or alternative, communication channels, including but not limited to Bluetooth, NFC, IR, optical character recognition (OCR), machine-readable codes such as barcodes and QR codes, etc. In an embodiment, a secret key (e.g., a symmetric key) is stored in secure memory on field device 102 at the factory for the purpose of allowing decoded and authentication of a received virtual switch setting in the plant. Encrypted virtual key settings are provided by the manufacturer either via secure media with the field device 102 at delivery time or from a secure portal after verification of the device Identifier and secure login by a customer. In another embodiment, a public key is shared with field device 102. The public key for virtual switch settings is shared from the field device 102 to the plant server 112 during discovery (initial connection and authentication). Subsequent virtual switch settings may then be created by a server at the plant and then sent to field device 102 where the device can decrypt the settings using its private key companion to the shared public key. Either of these embodiments can be used to create and share the secure virtual switch settings between the plant and the field device 102 in any of the identified virtual switch setting scenarios described above and to verify the identity of the user and authenticate field device 102. Moreover, various combinations of hardware and virtual switch settings and authentication techniques described above may be used to prevent unauthorized parties from accessing field device 102.

Figure 5:
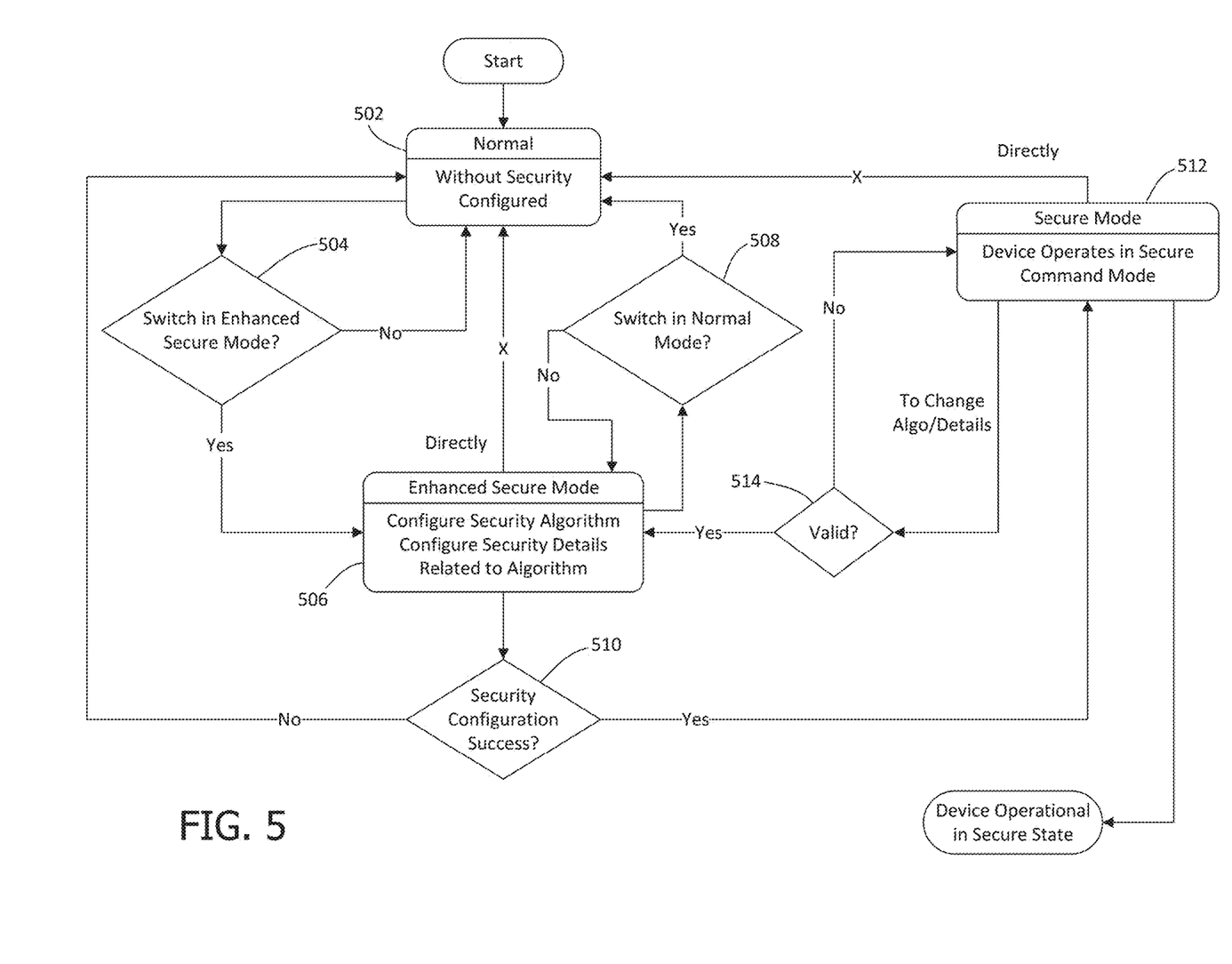
FIG. 5 is an example device state diagram according to an embodiment.

FIG. 5 is an example device state diagram according to an embodiment. The switch referenced in FIG. 5 may be the hardware switch 110 or a virtual switch as described in connection with FIGS. 2-4. The field device 102 begins in a normal mode at 502 in which no enhanced or special security settings are in place. At 504, a user places field device 102 in an enhanced secure mode 506 through hardware switch 110 during initial commissioning of the device 102. In an alternative embodiment, the user employs a virtual switch as described above. The switch reveals a token to the connected system, which entitles privileged actions for a time, optionally terminating it or allowing it when the switch setting has been reverted back to normal. To configure the security algorithms and security details of field device 102 in the enhanced secure mode 506, the user is first authenticated with a software-generated code executing on field device 102. This ensures the valid user is performing the commissioning. At 506, the user configures field device 102 using custom commands that require the security configuration based on the mechanism selected by the user (e.g., trusted hosts and operations/commands from each host). In an embodiment, only a local connected user with hardware switch 110 can be allowed to configure the security-related details of the device 102, such as cryptographic algorithms, trusted hosts, etc. This removes risk of any unauthorized remote user updating the IP address/operations data. Returning the switch 110 to a normal mode, unconfigures the security and returns device 102 to the normal mode 502.

If the security configurations are successful at 510, field device 102 operates in a secure mode 512 according to the new security configurations. In this embodiment, configuration occurs in the enhanced secure mode 506 and operation occurs in the secure mode 512. For example, device type manager (DTM) software includes one or more commands to replace the generic commands with custom commands. Other software similar to DTM can include RTU configuration software tools. At 514, the user attempts to configure the previously configured security details of field device 102. The user can change any such security detail only by moving to the enhanced secure mode. In an embodiment, the device 102 is not operational while being configured in the enhanced secure mode and the generic commands are replaced with custom commands in the functional mode, i.e., the secure mode. Each request is authenticated against predetermined security details in the secure mode and unpacked in device 102 to check whether it is a valid request based on the security configuration. Once validated at 514, a response can be sent indicating whether the changes to the security algorithm and to the details related to the algorithm are valid. Once in the secure mode, the switch setting is preferably rechecked before allowing the enhanced secure mode again.

FIGS. 6, 7A, 7B, and 8 illustrate additional details of the disclosed process for providing enhanced security for network-connected process control instruments such as field device 102.

Figure 6:
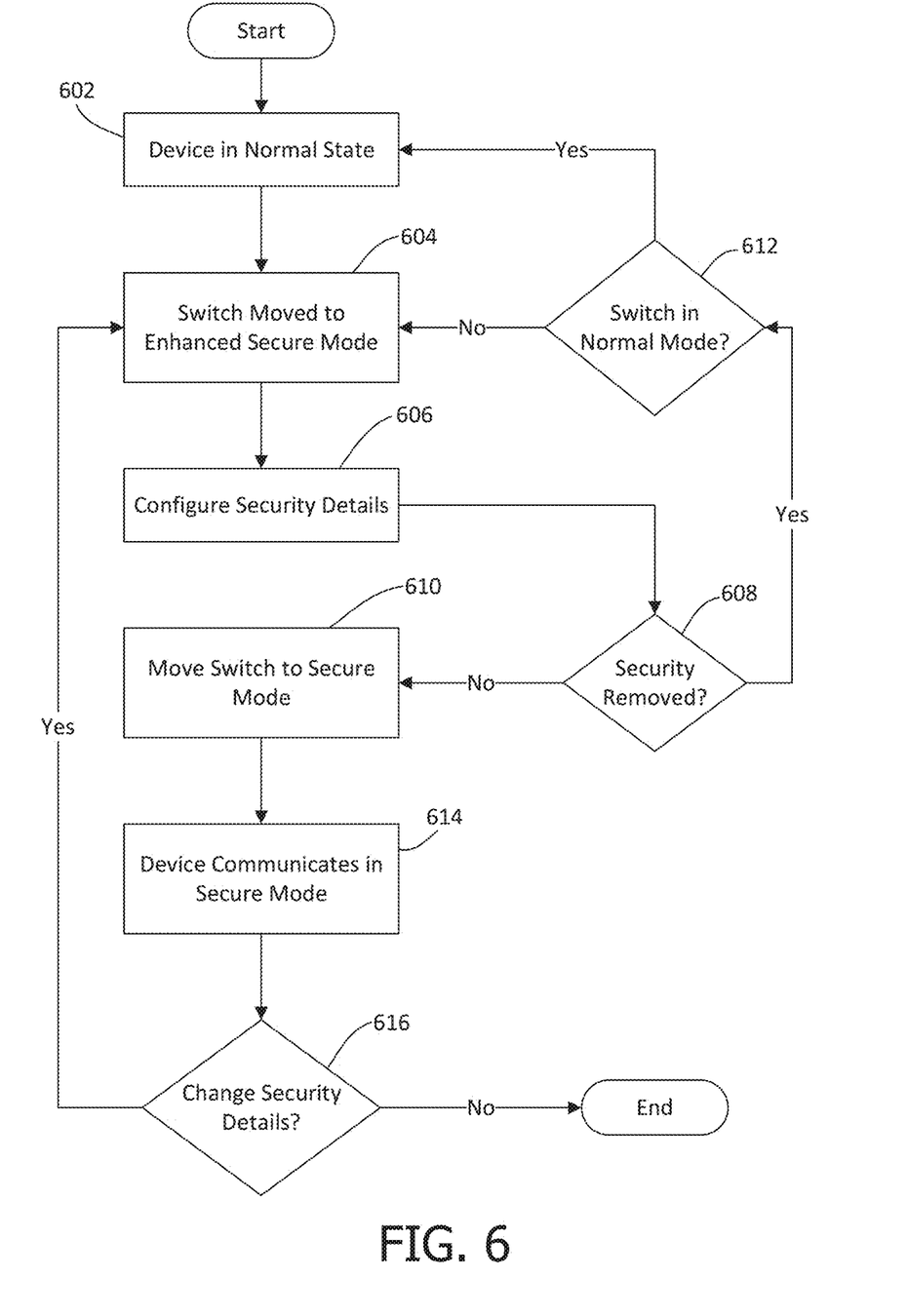
FIG. 6 is an example device state flow diagram according to an embodiment.

Referring to FIG. 6, an example device state flow diagram according to an embodiment is shown. The field device 102 begins in a normal state, or mode, at 602. Moving the switch (hardware switch 110 or a virtual switch) at 604 to the enhanced secure mode permits configuration of the security details at 606. If it is determined at 608 that security has not been removed, the user may move the switch to the secure mode at 610. On the other hand, if security has been removed, the example flow proceeds to 612 for determining whether the switch has been returned to the normal mode. If the switch is in the normal mode at 612, field device 102 operates in the normal state at 602. When the switch is in the secure mode at 610, field device 102 communicates in the secure mode at 614. If the switch is not in the normal mode at 612 or if any of the security details were changed at 616, the example process flow returns to 604.

Figure 7A:
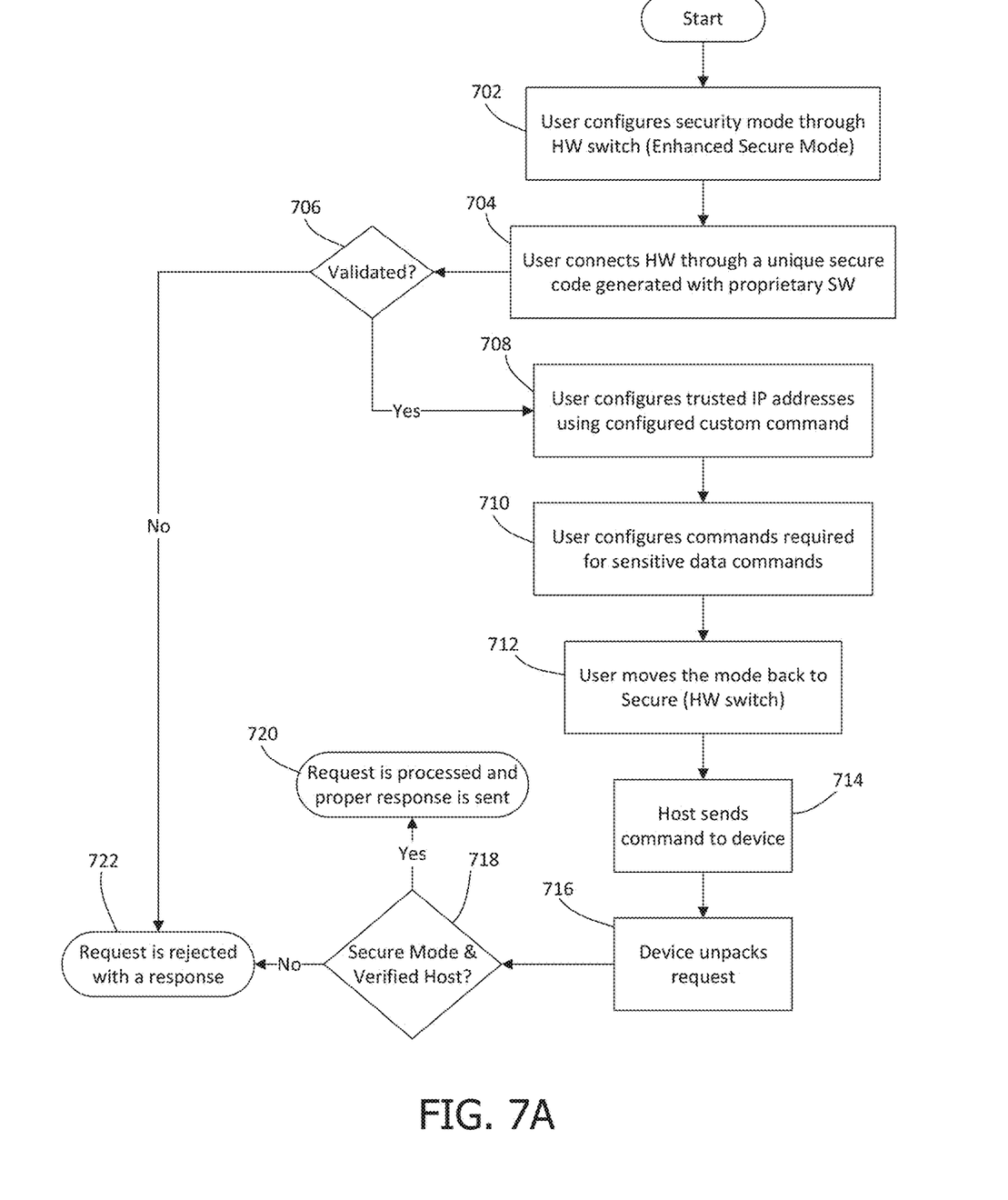
FIGS. 7A and 7B are example device communication flow diagrams according to an embodiment illustrating a method of enhancing security in process control instruments.
Figure 7B:
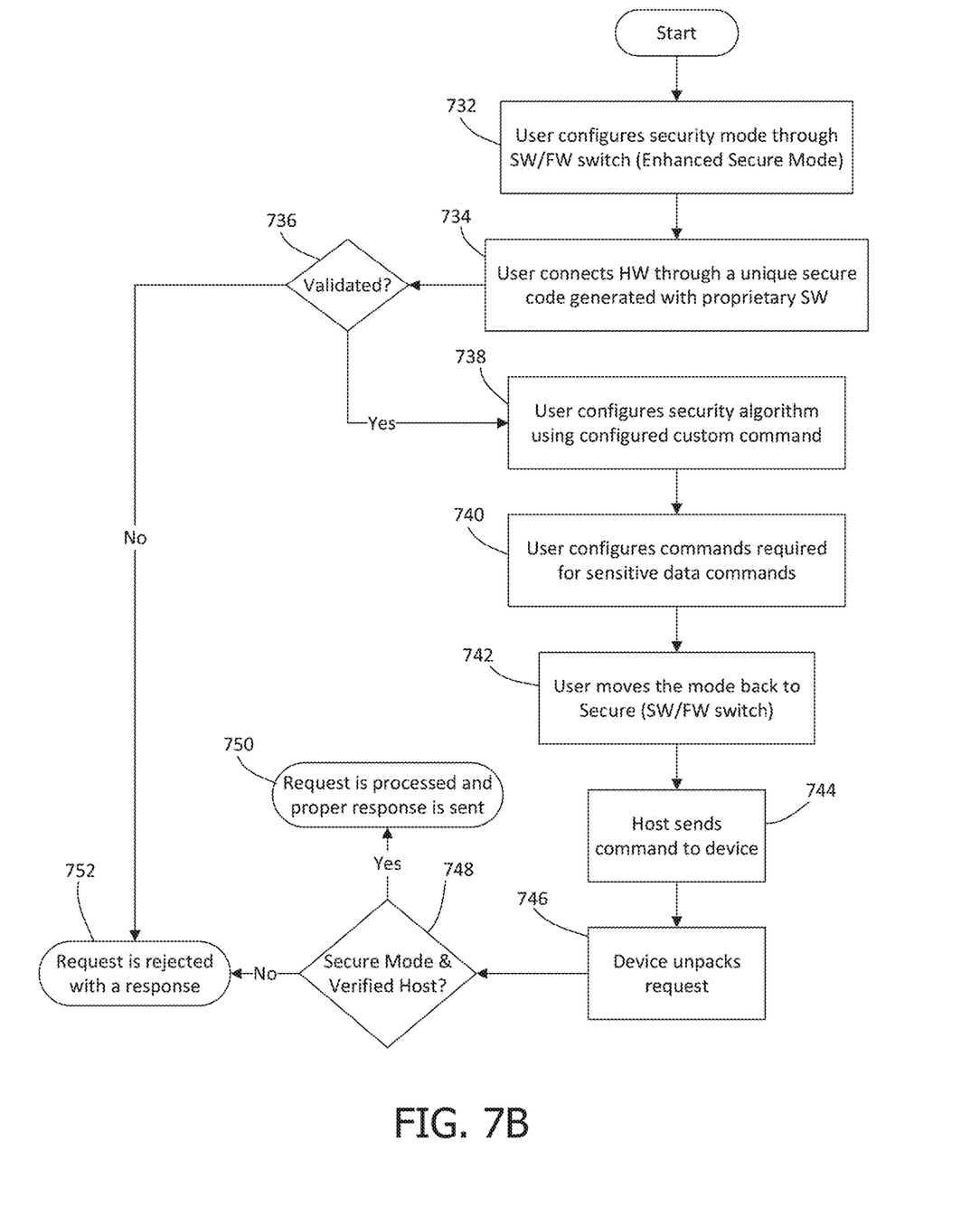

FIGS. 7A and 7B are example device communication flow diagrams illustrating methods of enhancing security in process control instruments such as field device 102. In FIG. 7A, at 702, the user configures the security mode of field device 102 through hardware switch 110 to enter the enhanced secure mode. At 704, the user connects field device 102 to the plant through a unique secure code generated with proprietary software. The authorization server 112 uses the unique secure code to validate field device 102 at 706. It is to be understood that the user may be authenticated at this time as well. After the validation step, the user is able to configure the security algorithm/ procedure to implement trusted hosts at selected IP addresses using configured custom commands at 708. In an alternative embodiment, other security measures, such as encryption, digital signatures, etc. may be implemented in addition to or instead of trusted IP addresses. In addition, the user is able to configure the commands needed to permit sensitive data commands at 710. Proceeding the 712, the user moves the mode back to secure using hardware switch 110 and, at 714, the host sends commands to device 102. The field device 102 unpacks the received commands at 716. If field device 102 is in the secure mode and the host is verified at 718 based on the previously configured security algorithm/procedure, the request is processed and a proper response is sent at 720. On the other hand, if authorization server 112 could not validate field device 102 at 706 or if field device 102 is not the secure mode or the host is not verified at 718, the request is rejected with a corresponding response at 722. In an embodiment, the state of switch 110 is also reset to its previous state.

In an alternative embodiment, as shown in FIG. 7B, the user configures security mode through a virtual switch implemented in software or firmware. In FIG. 7B, at 732, the user configures the security mode of field device 102 through the virtual switch (e.g., software or firmware) to enter the enhanced secure mode. At 734, the user connects field device 102 to the plant through a unique secure code generated with proprietary software. The authorization server 112 uses the unique secure code to validate field device 102 at 736. It is to be understood that the user may be authenticated at this time as well. After the validation step, the user is able to configure the device's security algorithm using configured custom commands at 738 to implement trusted IP addresses, trusted host, encryption, and/or digital signatures, or the like. In addition, the user is able to configure the commands needed to permit sensitive data commands at 740. Proceeding the 742, the user moves the mode back to secure using the virtual switch and, at 744, the host sends commands to device 102. The field device 102 unpacks the received commands at 746. If field device 102 is in the secure mode and the host is verified at 748 based on the previously configured security algorithm/procedure, the request is processed and a proper response is sent at 750. On the other hand, if authorization server 112 could not validate field device 102 at 736 or if field device 102 is not the secure mode or the host is not verified at 748, the request is rejected with a corresponding response at 752. In an embodiment, the state of the virtual switch is also reset to its previous state.

In the enhanced secure mode, the user configures trusted IP addresses (or security details) using configured custom commands or customizable proprietary commands. For older devices where a hardware change is not possible for a specific software command, pre/post actions can be invoked using the DTM to translate the commands. The user connects hardware through a unique secure code generated with proprietary software, such as via the DTM. The DTM that translates normal commands to secure commands is based on the mode.

Figure 8:
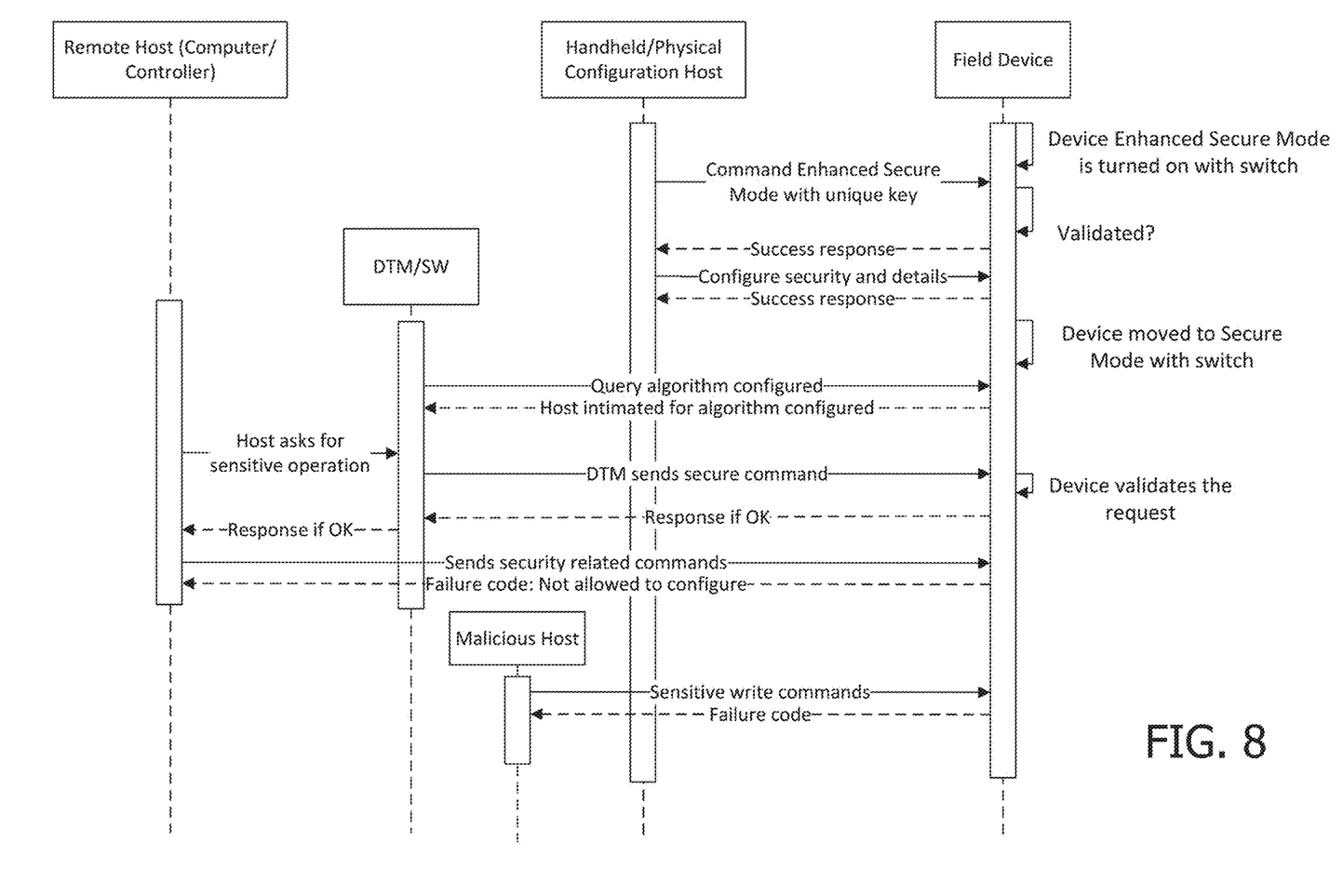
FIG. 8 is an example flow sequence diagram according to an embodiment.

FIG. 8 is an example flow sequence diagram according to an embodiment illustrating how the secure mode works. First, the remote host, which may be computer or controller, requests a sensitive operation. In other words, the host attempts to send a secure command to the configurator, indicated DTM/SW. The flow sequence illustrates the chain of custody of a private key. Operating field device 102 in the secure mode according to the present disclosure eliminates fear of compromise from other remote hosts. Even if the host is compromised, it will not allow all commands due to the device's configuration, which only allows certain commands/operations from the particular host.

Conventional process control instruments may be reset without credentials, which presents a security threat. Aspects of the present disclosure provide additional security for remote process control instruments such as field device 102 by restricting a user's ability to reset the device. This feature is particularly useful when a programmable device (e.g., field device 102) is physically unattended and vulnerable to malicious tampering. The field device 102 communicates periodically with one or more central systems that need to be assured that it has not been tampered with. The initial setup process is to be performed locally to the device 102 using a local terminal of some kind. Before initial setup, a reset is needed to ensure the device 102 is initialized.

In an embodiment, the device 102 may only be reset when it is in the enhanced secure mode, which can be used to support a factory reset with credentials based on the security configuration, either locally or remotely. A factory reset causes the public identifier of field device 102 to change so that the central system can be made aware of the change and to enable a reset even when codes have been forgotten. Without credentials, the user employs hardware switch 110 to initiate the reset. For example, the user activates switch 110 and/or cycles power followed by a time delay so that the central system can respond to the device's reset attempt or absence. If powered, holding the switch position for a long time using hardware switch 110 (e.g., a physical button, reed switch, etc.) permits the device 102 to continue communicating but indicates to the central system that a reset is in progress. If unpowered, opening the device 102 and activating switch 110 uses a memory battery to respond to the switch setting for clearing the memory. The time delay or duration is set in the device configuration.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements.

The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A process control system comprising:
at least one process control instrument, the process control instrument having a switch configured for placing the process control instrument in a selected one of a plurality of access modes as determined by a switch setting thereof, the access modes including a normal mode in which the process control instrument performs non-secure functionality, an enhanced secure mode in which access for configuring security details of the process control instrument is restricted to an authorized user, and a secure mode in which the process control instrument operates in accordance with the security details as configured in the enhanced secure mode, the process control instrument storing a unique secure code associated therewith;

at least one controller configured to communicate on a plant cloud, the controller communicatively coupled to the process control instrument via a control network; and an authorization server communicatively coupled to the controller directly or via the plant cloud, the authorization server configured to authenticate the process control instrument based on the unique secure code provided thereto in response to the process control instrument entering the enhanced secure mode, wherein:

in response to being authenticated in the enhanced secure mode, the process control instrument is configured to operate in a configuration state in which the authorized user is granted access to configure security details of the process control instrument.

2. The process control system of claim 1, wherein the normal mode comprises a default state of the process control instrument.

3. The process control system of claim 1, further comprising a physical hardware switch associated with the process control instrument defining the switch setting for determining the access mode of the process control instrument.

4. The process control system of claim 3, wherein the hardware switch is isolated from contact by the user.

5. The process control system of claim 3, wherein the hardware switch is configured for initiating a factory reset of the process control instrument.

6. The process control system of claim 1, wherein the process control instrument comprises a memory device storing processor-executable instructions that, when executed by the process control instrument, generate the secure code.

7. The process control system of claim 1, wherein the secure code is time-restricted such that it is only valid for a predetermined period of time.

8. The process control system of claim 1, wherein the authorization server comprises at least one of a certificate server and a key server.

9. The process control system of claim 1, further comprising a portable computing device for receiving a device identifier from the process control instrument, wherein the authorization server is responsive to the device identifier for providing an encrypted security switch setting to the process control instrument, and wherein the process control instrument is responsive to the encrypted security switch setting for entering the enhanced secure mode.

10. The process control system of claim 9, wherein the portable computing device receives the device identifier from the process control instrument via a wireless connection therewith.

11. The process control system of claim 9, wherein the portable computing device receives the device identifier from the process control instrument by reading a machine-readable code displayed at the process control instrument.

12. The process control system of claim 9, wherein the portable computing device is communicatively coupled to the authorization server via a virtual private network (VPN).

13. The process control system of claim 9, wherein the authorization server provides the encrypted security switch setting to the process control instrument via the controller.

14. The process control system of claim 1, wherein the configured security details support a secure factory reset of the process control instrument.

15. A method of securing a process control instrument of a process control system, the process control instrument having a switch associated therewith, the method comprising:
- determining, by a controller of the process control system communicatively coupled to the process control instrument, a switch setting of the switch associated with the process control instrument, the switch setting placing the process control instrument in a selected one of a plurality of access modes, the access modes including a normal mode in which the process control instrument performs non-secure functionality, an enhanced secure mode in which access for configuring security details of the process control instrument is restricted to an authorized user, and a secure mode in which the process control instrument operates in accordance with the security details as configured in the enhanced secure mode;
- receiving, by an authorization server of the process control system communicatively coupled to the controller, a unique secure code stored in and associated with the process control instrument in response to the process control instrument entering the enhanced secure mode based on the determined switch setting; and
- authenticating, by the authorization server, the process control instrument based on the secure code;
- wherein in response to the process control instrument being authenticated in the enhanced secure mode, the process control instrument grants access to the authorized user for configuring security details of the process control instrument.

16. The method of claim 15, determining the switch setting comprising identifying a position of a physical hardware switch associated with the process control instrument.

17. The method of claim 15, further comprising executing, by the process control instrument, processor-executable instructions stored on the process control instrument to generate the secure code.

18. The method of claim 15, further comprising providing, by the authorization server, an encrypted security switch setting to the process control instrument based on a device identifier associated with the process control instrument, wherein the process control instrument is responsive to the encrypted security switch setting for entering the enhanced secure mode.

19. The method of claim 18, further comprising receiving, by a portable computing device, the device identifier from the process control instrument via a wireless connection between the process control instrument and the portable computing device.

20. The method of claim 15, further comprising performing, by the process control instrument, a secure factory reset based on the configured security details.

\* \* \* \* \*